United States Patent
Bush et al.

(10) Patent No.: US 7,320,340 B2
(45) Date of Patent: Jan. 22, 2008

(54) FLUID PRESSURE REDUCTION DEVICES

(75) Inventors: Donald Ray Bush, Marshalltown, IA (US); Raymond W. Micheel, Gilman, IA (US)

(73) Assignee: Fisher Controls International LLC, St. Louis, MO (US)

( * ) Notice: Subject to any disclaimer, the term of this patent is extended or adjusted under 35 U.S.C. 154(b) by 467 days.

(21) Appl. No.: 10/810,003

(22) Filed: Mar. 26, 2004

(65) Prior Publication Data

US 2005/0211321 A1    Sep. 29, 2005

(51) Int. Cl.
*F15D 1/00*    (2006.01)
(52) U.S. Cl. .......................................... 138/42; 138/43
(58) Field of Classification Search ................. 138/42, 138/43
See application file for complete search history.

(56) References Cited

U.S. PATENT DOCUMENTS

| | | | |
|---|---|---|---|
| 3,722,854 A | 3/1973 | Parola | |
| 3,921,668 A * | 11/1975 | Self | 137/625.3 |
| 4,068,683 A | 1/1978 | Self | 137/625.3 |
| 4,103,534 A | 8/1978 | Hoof | 73/37 |
| 4,127,146 A | 11/1978 | Self | 137/625.3 |
| 4,249,574 A | 2/1981 | Schnall et al. | |
| 4,473,210 A | 9/1984 | Brighton | |
| 4,567,915 A * | 2/1986 | Bates et al. | 138/42 |
| 4,671,321 A * | 6/1987 | Paetzel et al. | 137/625.3 |
| 5,020,571 A * | 6/1991 | Tartaglia et al. | 137/625.3 |
| 5,390,896 A | 2/1995 | Smirl | 251/127 |
| 5,687,763 A | 11/1997 | Steinke | 137/625.33 |
| 5,769,122 A | 6/1998 | Baumann et al. | 137/625.33 |
| 5,803,119 A | 9/1998 | Steinke | 137/625.37 |
| 5,941,281 A | 8/1999 | Baumann et al. | 137/625.33 |
| 6,026,859 A | 2/2000 | Wears et al. | 137/625.33 |
| 6,095,196 A | 8/2000 | McCarty et al. | 138/42 |
| 6,382,253 B1 | 5/2002 | McCarty et al. | 137/625.33 |
| 6,394,134 B1 | 5/2002 | Kwon | |

(Continued)

FOREIGN PATENT DOCUMENTS

DE    25 14 879    10/1976

(Continued)

OTHER PUBLICATIONS

*International Search Report*, International Bureau, May 13, 2005, 4 sheets, PCT/US2005/004649.

(Continued)

*Primary Examiner*—James Hook
(74) *Attorney, Agent, or Firm*—Hanley, Flight & Zimmerman, LLC

(57) ABSTRACT

Fluid pressure reduction devices for use in gas and liquid handling systems are disclosed. An example fluid pressure reduction device includes a plurality of cylinders, each having an inner diameter surface and an outer diameter surface and a plurality of apertures that extend from the inner diameter surface to the outer diameter surface. The cylinders are arranged in a nested configuration so that a substantial portion of the inner diameter surface of one of the plurality of cylinders is in contact with a substantial portion of the outer diameter surface of another one of the cylinders. Portions of the apertures of one of the cylinders overlap at least portions of the apertures of another one of the cylinders to form a process fluid flow path.

35 Claims, 5 Drawing Sheets

U.S. PATENT DOCUMENTS

| | | | |
|---|---|---|---|
| 6,701,957 B2 | 3/2004 | McCarty et al. | 137/625.3 |
| 6,739,426 B2 | 5/2004 | Sherikar et al. | 181/248 |
| 2003/0221906 A1 | 12/2003 | Sherikar et al. | 181/248 |
| 2004/0050433 A1 | 3/2004 | Nawaz et al. | 137/625.39 |

FOREIGN PATENT DOCUMENTS

| | | |
|---|---|---|
| DE | 26 41 761 | 9/1977 |
| GB | 2 057 637 | 4/1981 |

OTHER PUBLICATIONS

*Written Opinion of the International Searching Authority*, International Bureau, May 13, 2005, 6 sheets, PCT/US2005/004649.

"*Cavitrol® III one-, Two-, and Three-Stage Trims*", Cavitrol III Trims, Emerson Process Management, Product Buletin, Sep. 2003, 12 pages.

"*WhisperFlo® Vent Diffuser*", Emerson Process Management, Product Buletin, Aug. 2002, 4 pages.

"*CAVIII Technical Highlights*", Emerson Process Management, Admitted prior art, Published electronically on Jan. 9, 2002, 1 page.

"*WhisperFlow™ Trim-New Technology That Quiets Control Valve Noise*", Fisher Controls International, Inc., Dec. 1997, 10 pages.

"*Valtek Megastream Control Valves*", Rev. Apr. 1999, Flowserve Corporation, 1999,12 pages.

"*Valtek CavControl Trim*", Rev. Apr. 1999, Flowserve Corporation, 1998, 4 pages.

"*Tiger-Tooth Control Valves*", Rev. Dec. 1993, Flowserve Corporation, 1996, 12 pages.

"*Atmospheric Resistors*", Control Components Inc., Feb. 1998, 8 pages.

"*DRAG® Technology for Boiler Feedpump Recirculation Applications*", Control Components Inc., Mar. 2003, 8 pages.

"*CCI Drag® Compressor Recycle Anti-Surge Valve*", Control Components Inc., Jan. 2003, 8 pages.

"*CCI Choke Valve*", Control Components Inc., May 2002, 8 pages.

"*DRAG® 800D Control Valves for Severe Service Applications*", Control Components Inc., Aug. 2002, 8 pages.

"*Sulzer Valves-Low Pressure Turbine Bypass Valve NBSE™*", Control Components Inc., Mar. 2002, 8 pages.

"*DRAG® The Valve Doctor® Solution*", Control Components Inc., Retrieved from the Internet on Jun. 25, 2004: <URL http://www.ccivalve.com/pdf/451.pdf>, 8 pages.

* cited by examiner

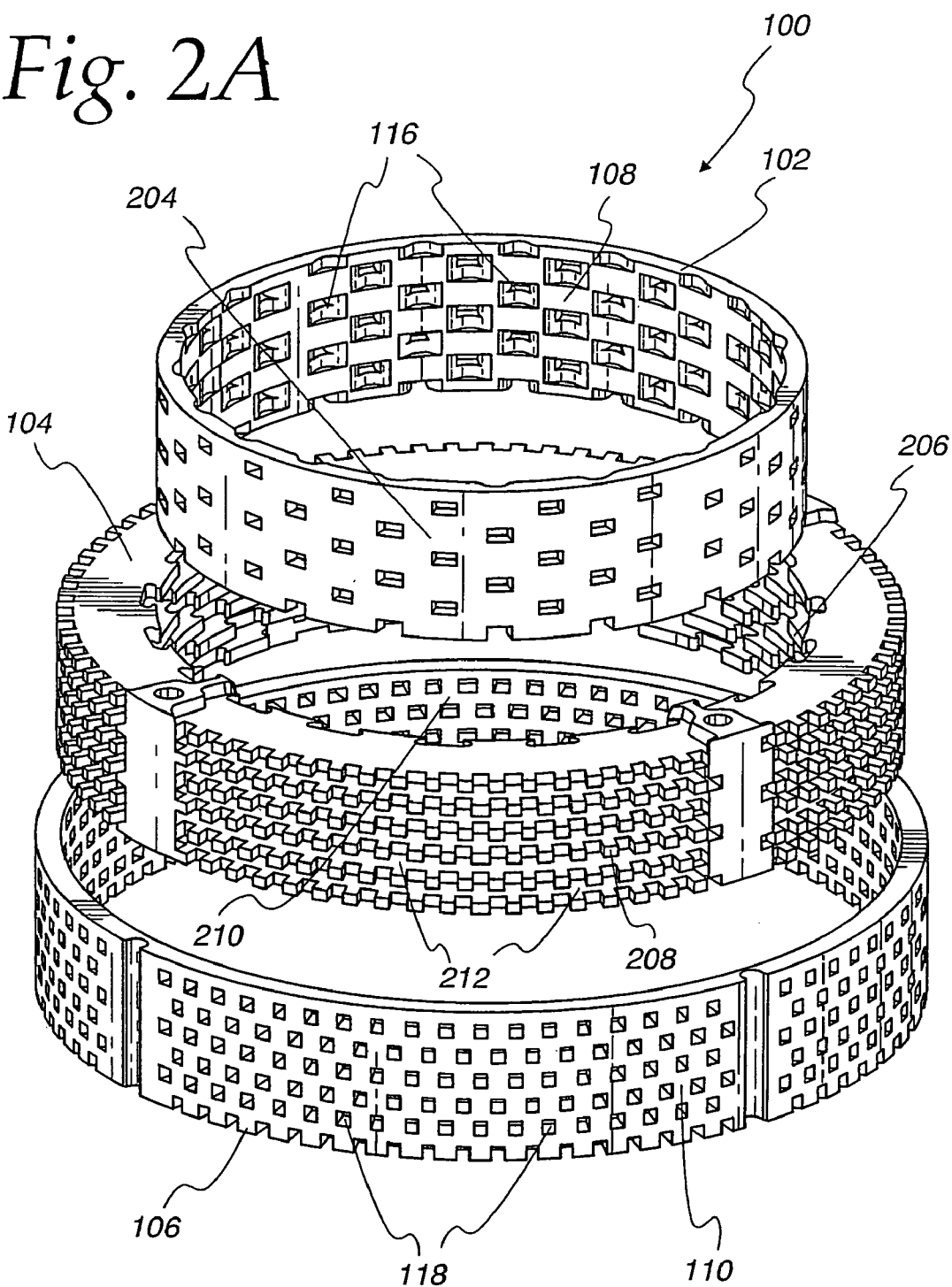

FLUID PRESSURE REDUCTION DEVICES

FIELD OF THE DISCLOSURE

The present disclosure relates generally to fluid pressure reduction devices and, more particularly, to fluid pressure reduction devices for use in process fluid handling systems.

BACKGROUND

Process fluid handling systems typically use pipes and valves to transport process fluids. The fluid pressures associated with process fluid handling systems often generate forces that affect the flow of the process fluids. The forces generated at one stage of a process fluid handling system may affect gases or liquids throughout the system.

The effects of the forces generated by pressurized process fluids in process fluid handling systems are often undesirable. For example, pressurized gases and liquids may accumulate large amounts of potential energy that may be dissipated as heat and noise. Conversion of accumulated potential energy to heat typically raises the temperature of the process fluid as well as the pipes, valves, etc. through which the process fluid flows, and may lead to unpredictable and undesirable behavior such as system breakdowns. Accumulated potential energy is typically released by opening valves (which release fluid pressure) in the process fluid handling system.

The release or dissipation of the potential energy stored in process fluids may also result in audible noise. Audible noise typically results when process fluid turbulence causes the process fluid to reverberate or resonate against pipe walls, valve structures, etc.

Many developments have been directed to reducing noise and other undesirable effects associated with reducing pressure and stored potential energy in process fluid handling systems. For example, one method to reduce the generation of audible noise includes insulating pipes with noise attenuating. However, pipe insulation and other methods of masking the undesirable effects of pressure and stored potential energy in process fluids do not address the cause of the undesirable effects. Nor do these methods reduce or eliminate the potentially destructive effects that the pressure and/or stored potential energy may have. Other developments include in-line apparatus that, when placed in the pipes and/or valves of a process fluid handling system, reduce or control process fluid pressures and stored potential energy as well as the undesirable effects associated therewith.

One example of a device used to reduce or control process fluid pressure build-up is a multiple stage cylindrical device described in U.S. Pat. No. 4,567,915 issued to Bates et al. The multiple stage cylindrical device described by Bates et al. includes a plurality of cylinders, each of which is press-fit inside of another cylinder and each of which has a plurality of drilled holes extending through the cylinder from an outer cylinder surface to an inner cylinder surface. Each of the cylinders of the multiple stage device disclosed by Bates et al. also has a circumferential flange at each cylinder end. When the cylinders are press-fit together, the flanges separate the cylinders so that a cavity or space is maintained between the cylinder walls. In this manner, gases or liquids flowing through the drilled holes of one cylinder may enter an open cavity between cylinders, flow through the drilled holes of a next cylinder, and then either enter another cavity between cylinders or flow outside of the multiple stage cylindrical device.

The multiple stage device disclosed by Bates et al. has several drawbacks. In particular, the device disclosed by Bates et al. is manufactured using a plurality of pre-formed cylinders. A plurality of holes is drilled into each pre-formed cylinder to enable liquids and gases and other process fluids to flow through the device. However, because the holes are drilled, the geometry of the holes is typically limited to substantially circular openings, thereby limiting the types of mechanical resistances, pressure attenuations, and noise attenuations that may be provided. Additionally, the drilling process can be a time consuming and costly process that is prone to errors and defective finished products.

A further drawback of the multiple stage device disclosed by Bates et al. is associated with the cavity or space formed between the cylinders. Specifically, little, if any, control can be imposed on the process fluid flowing in the cavities or spaces between each cylinder stage because the cavities or spaces allow relatively free (i.e., unrestricted) flow, which can result in turbulent flow patterns that generate process fluid pressure fluctuations causing audible noise, heat, etc.

An example of a multiple stage device based on a stack of substantially flat or planar rings is described in U.S. Pat. No. 5,769,122 issued to Baumann et al. The stacked-ring device disclosed by Baumann et al. uses substantially flat or planar rings having pre-cut grooves. The grooved flat rings are stacked to form a cylinder having a plurality of flow paths extending from an inner surface of the cylinder to an outer surface of the cylinder. The flow paths are formed via a plurality of complementary holes or grooves formed on the flat rings. The flow paths may be split into several paths and configured to include directional changes and obstructions. In general, the configuration of the flow paths causes a process fluid to dissipate a substantial amount of potential energy and, thus, pressure while traveling through the flow paths.

However, the stacked-ring fluid pressure reduction device disclosed by Baumann et al. is costly and time consuming to manufacture. The flat rings are typically laser cut from a large flat piece of material (i.e., flat stock). Manufacture of the flat rings often results in a relatively large amount of scrap that increases costs. Additionally, cutting each flat ring also increases the amount of time that it takes to manufacture a stacked-ring fluid pressure reduction device, which may have a significant number of flat rings (e.g., fifty stacked flat rings).

The stacked-ring fluid pressure reduction device disclosed by Baumann et al. may also be difficult to assemble. For example, several difficulties are typically encountered when stacking and joining the flat rings. In particular, the flat rings are stacked on top of each other in a predetermined orientation and then brazed together. This process is often associated with dimensional control problems such as maintaining the height and straightness of the stacked rings within a predetermined tolerance. Additionally, the performance of the joints produced by brazing is often not acceptable and leads to the production of defective parts. Still further, the orientations of the stacked rings are often difficult to control and quality issues associated with flat ring orientation often lead to time-consuming corrections or wasted material. In addition to cost, time, and manufacturing problems, some materials are often not available in sheet form to manufacture the flat rings needed to produce a stacked-ring fluid pressure reduction device.

SUMMARY

An example fluid pressure reduction device disclosed herein may be used to reduce the potential energy, pressure, and/or noise that accumulates in a process fluid such as, for example, a gas or liquid in a process fluid handling system. In accordance with one example, a fluid pressure reduction device may include a first cylinder and a second cylinder. The first cylinder may include a first inner surface, a first outer surface, and a first plurality of apertures extending from the first inner surface to the first outer surface. The second cylinder may include a second inner surface, a second outer surface, and a second plurality of apertures extending from the second inner surface to the second outer surface. Additionally, the second cylinder may be disposed within the first cylinder so that a substantial portion of the first inner surface is in contact with a substantial portion of the second outer surface. Portions of the first plurality of apertures may overlap portions of the second plurality of apertures to form flow paths through which a process fluid may flow.

In accordance with another example, a fluid pressure reduction device may include a plurality of cylinders. Each of the cylinders may include an inner surface, an outer surface, and a plurality of apertures extending from the inner surface to the outer surface. The cylinders may be arranged in a nested configuration so that a substantial portion of the inner surface of one of the plurality of cylinders is engaged with a substantial portion of the outer surface of another one of the plurality of cylinders. Portions of the apertures of the one of the plurality of cylinders may overlap portions of the apertures of the other one of the plurality of cylinders to form at least one flow path. The flow path may be configured to reduce the potential energy, pressure, and/or noise in a process fluid when the process fluid traverses the flow path.

BRIEF DESCRIPTION OF THE DRAWINGS

FIGS. 2A and 2B are exploded isometric views of the example fluid pressure reduction device of FIG. 1.

DETAILED DESCRIPTION

Figure 1:
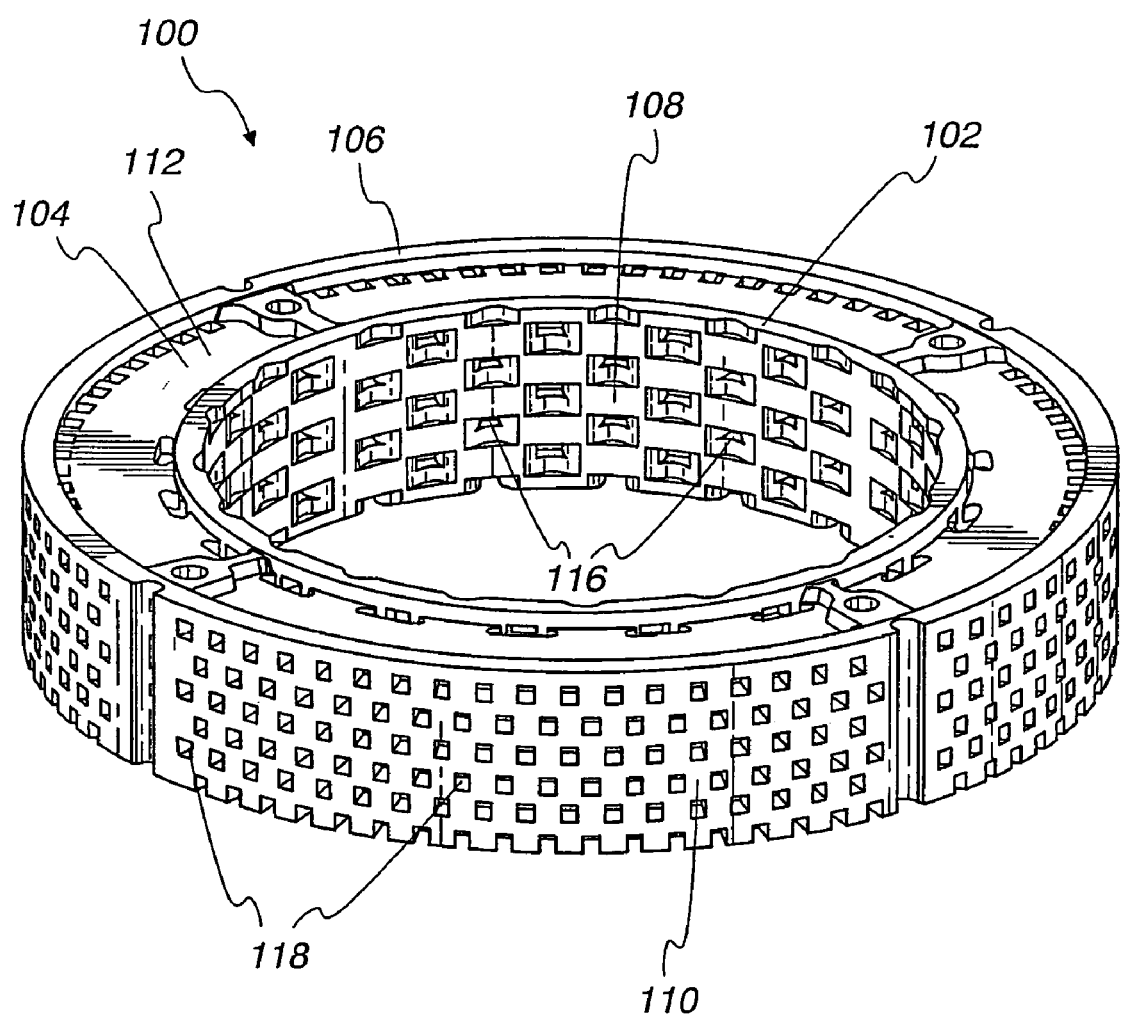
FIG. 1 is an isometric view of an example fluid pressure reduction device.

FIG. 1 is an isometric view of an example fluid pressure reduction device 100 (i.e., pressure reduction device) for use in process fluid handling applications. The example pressure reduction device 100 may be implemented as a valve cage or a diffuser to reduce pressure and noise in a process fluid handling system such as, for example, a gas or liquid production system, a process fluid transportation or distribution system, etc. More specifically, the example pressure reduction device (PRD) 100 may be used in an in-line configuration within a pipe and/or flow valve to cause the process fluid to flow through a plurality of flow paths within the example PRD 100. In this manner, the example PRD 100 may be used to reduce pressure and stored potential energy of process fluids (e.g., gases or liquids). The example PRD 100 may also be used to reduce the noise, heat build-up, and other undesirable effects that often result from releasing stored potential energy within a process fluid in an uncontrolled manner.

Now turning in detail to FIG. 1, the example PRD 100 includes a first ring or cylinder 102, a second ring or cylinder 104, and a third ring or cylinder 106. The first cylinder 102 is disposed or nested within the second cylinder 104 and the second cylinder 104 is disposed or nested within the third cylinder 106. The example PRD 100 also includes an inner diameter (ID) surface 108, an outer diameter (OD) surface 110 opposite the ID surface 108, a top surface 112, and a bottom surface (not shown) opposite the top surface 112. The ID surface 108 is formed by the ID surface of the first cylinder 102 and the OD surface 110 is formed by the OD surface of the third cylinder 106. The top surface 112 and the bottom surface are formed by the respective top and bottom surfaces of the cylinders 102, 104, and 106.

Each of the cylinders 102, 104, and 106 includes a plurality of holes, passages, or apertures that are configured to enable the example PRD 100 to be used as a pressure and/or noise-reducing device in process fluid applications. In particular, the first cylinder 102 includes a first plurality of apertures 116, the second cylinder 104 includes a second plurality of apertures (i.e., the second plurality of apertures 212 described in connection with FIGS. 2A and 2B), and the third cylinder 106 includes a third plurality of apertures 118. In the example PRD 100, the first plurality of apertures 116 may function as inlet stages, the second plurality of apertures 212 may function as plenums, and the third plurality of apertures 118 may function as outlet stages that are configured to form pre-determined flow paths through the example PRD 100. The pre-determined flow paths may be formed by overlapping at least portions of the inlet stages 116 with at least portions of the plenums 212 and/or overlapping at least portions of the plenums 212 with at least portions of the outlet stages 118. In this manner, process fluids can flow in a controlled manner via the pre-determined flow paths between the ID surface 108 and the OD surface 110. Additionally, the pre-determined flow paths formed via the overlapping apertures may be torturous flow paths.

Torturous flow paths may be implemented by mixing flow paths and subdividing flow paths into smaller flow paths. Mixing and subdividing flow paths provides a flow path contraction/expansion pair and/or a change in direction for a process fluid. For example, after a process fluid flows through the inlet stages 116, the second cylinder 104 causes the process fluid to change directions by splitting the flow paths in two axial directions toward adjacent upper and lower plenums 212 (FIG. 2). Each of the split flow paths flows radially and is distributed circumferentially in the respective plenums 212. The flow paths cause the process fluid to be mixed in the plenums 212 and to flow through the second cylinder 104. The process fluid is then subdivided or distributed through the outlet stages 118 as it flows toward the OD surface 110.

Figure 2B:
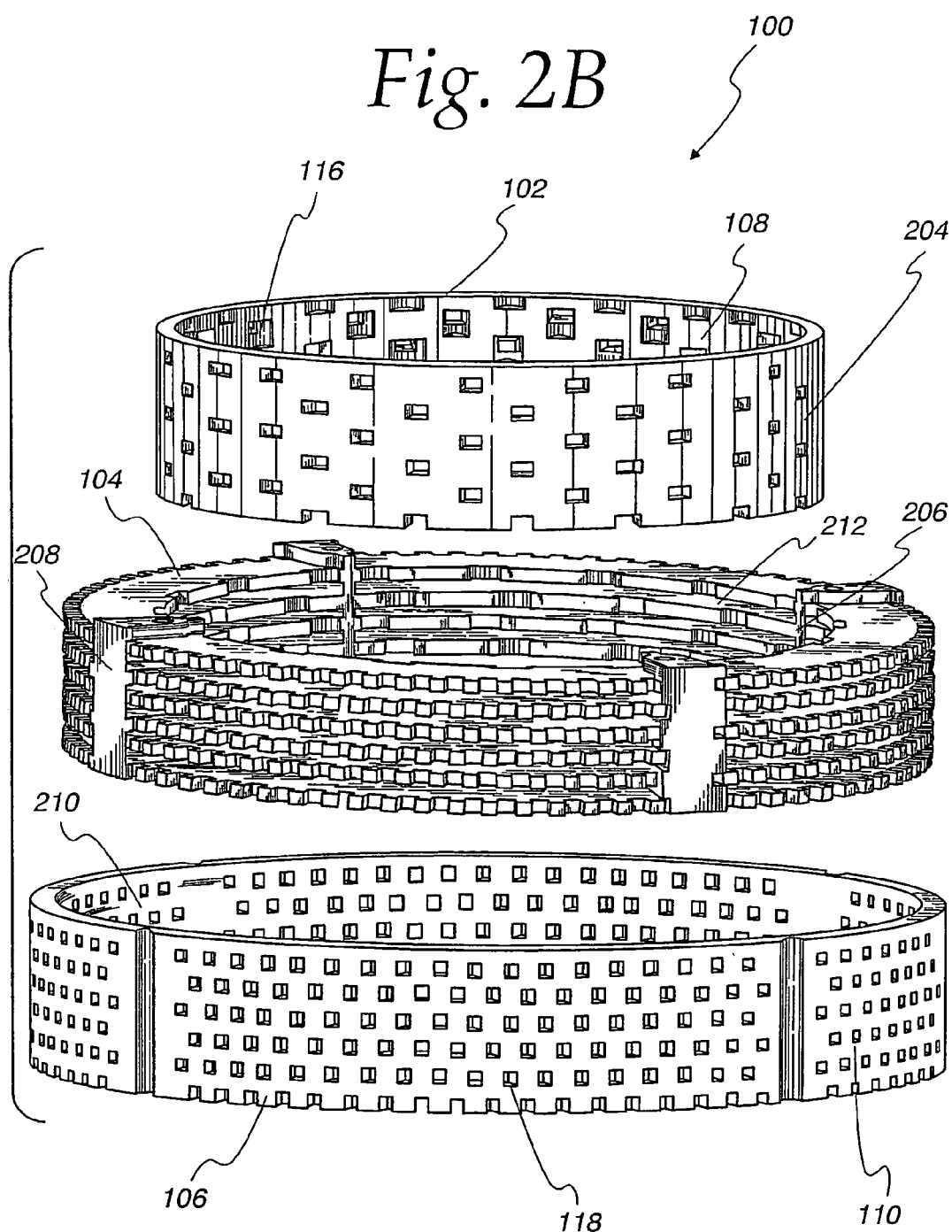

FIGS. 2A and 2B are exploded isometric views of the example PRD 100 of FIG. 1. The example exploded isometric views clearly illustrate the first cylinder 102, the second cylinder 104, and the third cylinder 106. Additionally, FIGS. 2A and 2B illustrate the mechanical relationship between the first cylinder 102, the second cylinder 104, and the third cylinder 106 and, in particular, illustrate the positions of the cylinders 102, 104, and 106 relative to one another prior to assembly.

Now turning in detail to the exploded view of FIG. 2A, the first cylinder 102 includes the first cylinder ID surface 108 and a first cylinder OD surface 204. The second cylinder 104 includes a second cylinder ID surface 206 and a second cylinder OD surface 208. The third cylinder 106 includes the third cylinder ID surface 210 and a third cylinder OD surface 110.

As shown most clearly in FIG. 2B, each of the example cylinders 102, 104, and 106 includes a plurality of apertures. The first cylinder 102 includes the inlet stages 116, each of which extends from the first cylinder ID surface 108 toward the first cylinder OD surface 204. The second cylinder 104 includes the second plurality of apertures 212, which are illustrated as being elongated apertures, slots, or plenums that are distributed along the circumference of the second cylinder 104 and extend from the second cylinder ID surface 206 through the second cylinder 104 to the second cylinder OD surface 208. The third cylinder 106 includes the outlet stages 118, each of which extends from the third cylinder ID surface 210 through the third cylinder 106 to the third cylinder OD surface 110.

The example cylinders 102, 104, and 106 may be made of any type of material or combination of materials, including metallic and/or non-metallic materials. Additionally, one or more manufacturing processes may be used to manufacture the example cylinders 102, 104, and 106 to have any desired diameter and length. The manufacturing processes may include, for example, investment casting, laser cutting, water jet cutting, electrical discharge machining (EDM), powder metallurgy (PM), metal injection molding (MIM), acid etching, a drawn tubing process, and/or any other suitable manufacturing or fabrication process. The above-mentioned manufacturing processes are well known to one of ordinary skill in the art and, thus, are not described in greater detail herein.

The above-mentioned manufacturing processes provide several methods to manufacture cylinders such as the example cylinders 102, 104, and 106. One example method includes laser cutting a rectangular piece of flat stock, bending the flat stock, and welding the ends of the rectangular flat stock to form a cylinder. Another example method includes investment casting, which involves pouring a molten metal into a ceramic mold. Investment casting enables the production of multiple cylinders simultaneously in a high-volume mass-production process without requiring substantial amounts of production equipment, thereby keeping manufacturing overhead costs relatively low. In contrast to the fabrication or manufacturing processes used to create known devices (e.g., the stacked-ring fluid pressure reduction device discussed above in connection with U.S. Pat. No. 5,769,122), several of the above-mentioned manufacturing processes such as, for example, PM and MIM enable the use of materials that are not readily available in flat stock to make the example cylinders 102, 104, and 106. In particular, materials such as, for example, metals, plastics, moldable fluoropolymers, polyether ether ketone (PEEK), etc. may be used with some or all of the above-mentioned manufacturing processes or similar processes to form the example cylinders 102, 104, and 106.

In some examples, each cylinder of the example PRD 100 may be formed from a different material to provide, for example, improved performance and reliability in a particular application. For example, during operation, the first cylinder ID surface 108 may function as a wear surface that is consistently exposed to the flow of a process fluid and, thus, subjected to harsher flow conditions than any other surface of the example PRD 100. When subjected to such harsh flow conditions, the first cylinder 102 may be made of a more durable material (i.e., a more wear-resistant material) than the second cylinder 104 and the third cylinder 106. The use of less durable and less expensive materials for the second and third cylinders 104 and 106 enables the overall cost of the example PRD 100 to be reduced and/or optimized for a particular application.

The shapes or geometries, sizes, and locations of the apertures 116, 212, and 118 are not limited by the above-mentioned manufacturing processes (e.g., to only circular or round openings). For example, MIM and investment casting processes involve creating a mold of a cylinder and injecting, pouring, or otherwise filling the mold with a desired material such as, for example, a metal powder for MIM or a molten metal for investment casting. After the material solidifies or forms, the cylinder is removed from the mold. The mold may be configured to produce cylinders having any number of apertures of any shape or geometry and at any location on the cylinders.

The example cylinders 102, 104, and 106 are configured to fit together in a nested configuration as shown in FIG. 1. For example, the first cylinder OD surface 204 and the second cylinder ID surface 206 are configured so that the first cylinder OD surface 204 fits within the second cylinder ID surface 206. Likewise, the second cylinder OD surface 208 and the third cylinder ID surface 210 are configured so that the second cylinder OD surface 208 fits within the third cylinder ID surface 210. In addition, the example cylinders 102, 104, and 106 may have alignment features that enable the apertures 116, 212, and 118 to align with one another and form a desired flow path when the cylinders 102, 104, and 106 are assembled to form the example PRD 100. An example alignment feature may include keyways in outer diameter surfaces and raised grooves or keys in corresponding inner diameter surfaces of adjacent cylinders. In this manner, the cylinders 102, 104, and 106 may be assembled so that the apertures of the cylinders 102, 104, and 106 align (e.g., overlap) with one another as desired.

The diameters of the cylinders 102, 104, and 106 may be configured so that the cylinders 102, 104, and 106 may be assembled using, for example, a press fitting and/or shrink fitting method. A press fitting method involves configuring the diameter of the first cylinder OD surface 204 to be equal to or somewhat greater than the diameter of the second cylinder ID surface 206. In this manner, the first cylinder 102 is stacked on top of the second cylinder 104 and a compressive force is applied to the top surface of the first cylinder 102 and the bottom surface of the second cylinder 104. The compressive force causes the first cylinder 102 to frictionally engage with and slide within the second cylinder 104.

A shrink fitting method is similar to the above-described press fitting method. However, in the shrink fitting method heat is applied to expand the second cylinder 104 prior to pressing the first cylinder 102 into the second cylinder 104. In any case, the press fitting method and/or the shrink fitting method may be used to fix the positions of the cylinders 102, 104, and 106 relative to one another to form the example PRD 100. However, any other methods may also be used to fix the positions of the cylinders 102, 104, and 106 such as, for example, brazing, welding, etc.

The example cylinders 102, 104, and 106 are assembled so that at least portions of the inlet stages 116 of the first cylinder 102 align with at least portions of the plenums 212 of the second cylinder 104 and so that at least portions of the plenums 212 align with at least portions of the outlet stages 118 of the third cylinder 106. In this manner, pre-determined, well-defined flow paths are formed between the inlet stages 116, the plenums 212, and the outlet stages 118.

Although the apertures 116, 212, and 118 may dictate one type of flow path, apertures may be configured to form any desired type of flow path. In the example PRD 100, the flow paths formed by the apertures 116, 212, and 118 may include slot-shaped apertures (e.g., the plenums 212) that cause a convergence of at least some flow paths within the second cylinder 104, while maintaining separation of flow paths through the first and third cylinders 102 and 106. However, apertures may be made of any size, any shape or geometry, and located at any position to provide any desired types of flow paths. Flow paths may be configured to suit any application. For example, non-elongated apertures may be formed in the second cylinder 104 so that separate flow paths are maintained throughout the example PRD 100. Apertures may be made in any shape including, for example, circular shapes, polygonal shapes, etc. Although the apertures 116, 212, and 118 have relatively straight or sharp edges, apertures may be formed with tapered or rounded edges. Additionally, the positions of the apertures 116, 212, and 118 may be configured so that less restrictive or more restrictive flow paths are formed.

Figure 3A:
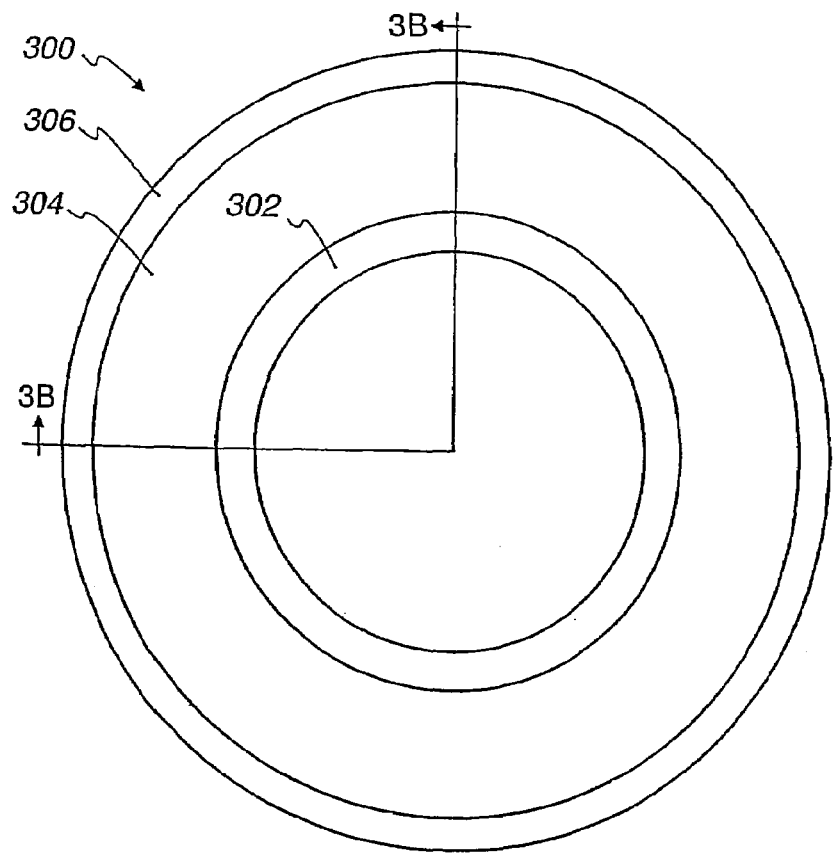
FIG. 3A is a plan view and FIG. 3B is an isometric cross-sectional view of another example fluid pressure reduction device that is substantially similar or identical to the example fluid pressure reduction device of FIGS. 1, 2A, and 2B.
Figure 3B:
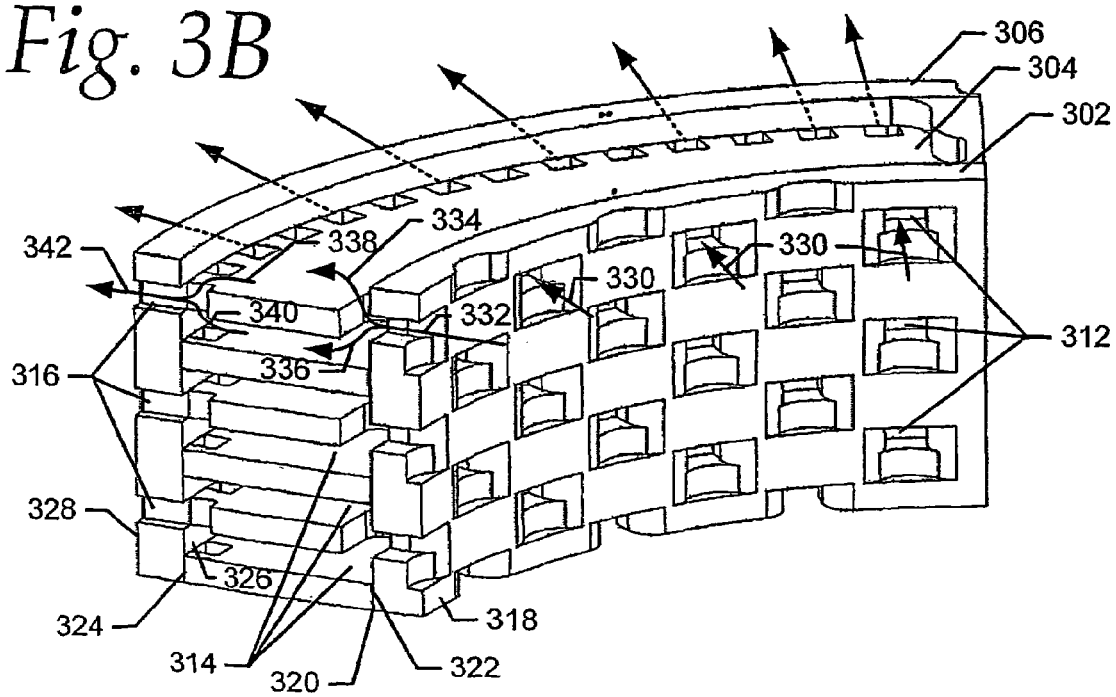

FIG. 3A is a plan view and FIG. 3B is an isometric cross-sectional view of another example PRD 300 that is substantially similar or identical to the example PRD 100 of FIGS. 1, 2A, and 2B. As described in greater detail below, FIGS. 3A and 3B may be used to illustrate example relationships between the flow of a process fluid and the example PRD structures described herein.

As shown in FIGS. 3A and 3B, the example PRD 300 includes a first cylinder 302 disposed or nested within a second cylinder 304, which is disposed or nested within a third cylinder 306. As clearly shown in FIG. 3B, the example PRD 300 includes a first plurality of apertures 312 (e.g., inlet stages), a second plurality of apertures 314 (e.g. plenums), and a third plurality of apertures 316 (e.g., outlet stages).

The first cylinder 302 includes a first cylinder ID surface 318, a first cylinder OD surface 320, and the inlet stages 312 that extend from the first cylinder ID surface 318 through the first cylinder 302 to the first cylinder OD surface 320. The second cylinder 304 includes a second cylinder ID surface 322, a second cylinder OD surface 324, and the plenums 314 that extend from the second cylinder ID surface 322 through the second cylinder 304 to the second cylinder OD surface 324. The third cylinder 306 includes a third cylinder ID surface 326, a third cylinder OD surface 328, and the outlet stages 316 that extend from the third cylinder ID surface 326 through the third cylinder 306 to the third cylinder OD surface 328.

As shown in FIGS. 3A and 3B, the example cylinders 302, 304, and 306 are assembled with the first cylinder OD surface 320 adjacent to the second cylinder ID surface 322 so that a substantial portion of the first cylinder OD surface 320 abuts with, is in contact with, is mechanically coupled to, and/or is engaged with a substantial portion of the second cylinder ID surface 322. Additionally, the second cylinder OD surface 324 is adjacent to the third cylinder ID surface 326 so that a substantial portion of the second cylinder OD surface 324 abuts with, is in contact with, is mechanically coupled to, and/or is engaged with a substantial portion of the third cylinder ID surface 326.

The example cylinders 302, 304, and 306 are assembled so that pre-determined flow paths may be formed by the plurality of apertures 312, 314, and 316. Additionally, because the first cylinder OD surface 320 is adjacent to the second cylinder ID surface 322, a process fluid is forced to stay within one or more pre-determined flow paths.

As shown in FIG. 3B, the apertures 312, 314, and 316 are at least partially aligned with one another to form flow paths between the first cylinder 302 and the third cylinder 306. A process fluid may initially flow in a direction and along paths generally indicated by the flow arrows 330. The process fluid may then flow into the inlet stages 312 and follow the flow paths generally indicated by the arrows 332 through 342 as described below. Although, the flow arrows/paths 330 through 342 are generally associated with applications in which a fluid flows from the first cylinder ID surface 318 toward the third cylinder OD surface 328, those having ordinary skill in the art will readily appreciate that the example PRD 300 may also be used in applications where a fluid flows from the third cylinder OD surface 328 toward the first cylinder ID surface 318, in which case the direction of the flow arrows/paths 330 through 342 are opposite those illustrated in FIG. 3B.

The flow paths 332, 334, 336, 338, 340, and 342 form example torturous flow paths through the plurality of apertures 312, 314, and 316. When a process fluid is split, redirected, and/or mixed by a torturous flow path, turbulences in the process fluid are broken down or reduced. In this manner, a torturous flow path causes a reduction in pressure and stored potential energy in the process fluid.

More specifically, in the example of FIG. 3B, as a process fluid flows in a direction indicated by the flow arrows 330, the process fluid is channeled through (i.e., enters) the inlet stages 312, which form a first pressure-reduction stage. The process fluid flows along the plurality of flow paths 332 towards the boundary of the first cylinder OD surface 320 and the second cylinder ID surface 322. The process fluid is then split in two axial directions and redirected or channeled into flow paths 334 and 336 in upper and lower adjacent plenums 314. The process fluid then flows radially and is distributed circumferentially in the plenums 314, which form a second pressure-reduction stage. At the boundary of the second cylinder OD surface 324 and the third cylinder ID surface 326, the flow path 334 may join or mix with other flow paths (not shown) within the same one of the plenums 314 to form the flow path 338. In addition, the flow path 336 may join or mix with other flow paths (not shown) within the same one of the plenums 314 to form the flow path 340. In this manner, the process fluid flows through the plenums and is subdivided or distributed through the outlet stages 316 as the flow paths 338 and 340 join or mix axially to form the flow path 342 to exit the third cylinder 306.

Although, the apertures 312, 314, and 316 are configured to form a torturous flow path, the methods of manufacture described in connection with FIGS. 2A and 2B may be used to form apertures that are configured to form any other type of flow path. Additionally, while the example PRDs described herein are depicted as having three cylinders (e.g., the example cylinders 102, 104, and 106 of FIG. 1 and the example cylinders 302, 304, and 306 of FIG. 3), such PRDs may instead be configured to include any other number of cylinders and any number of apertures of any desired geometry and position to form any desired flow paths.

Figure 4:
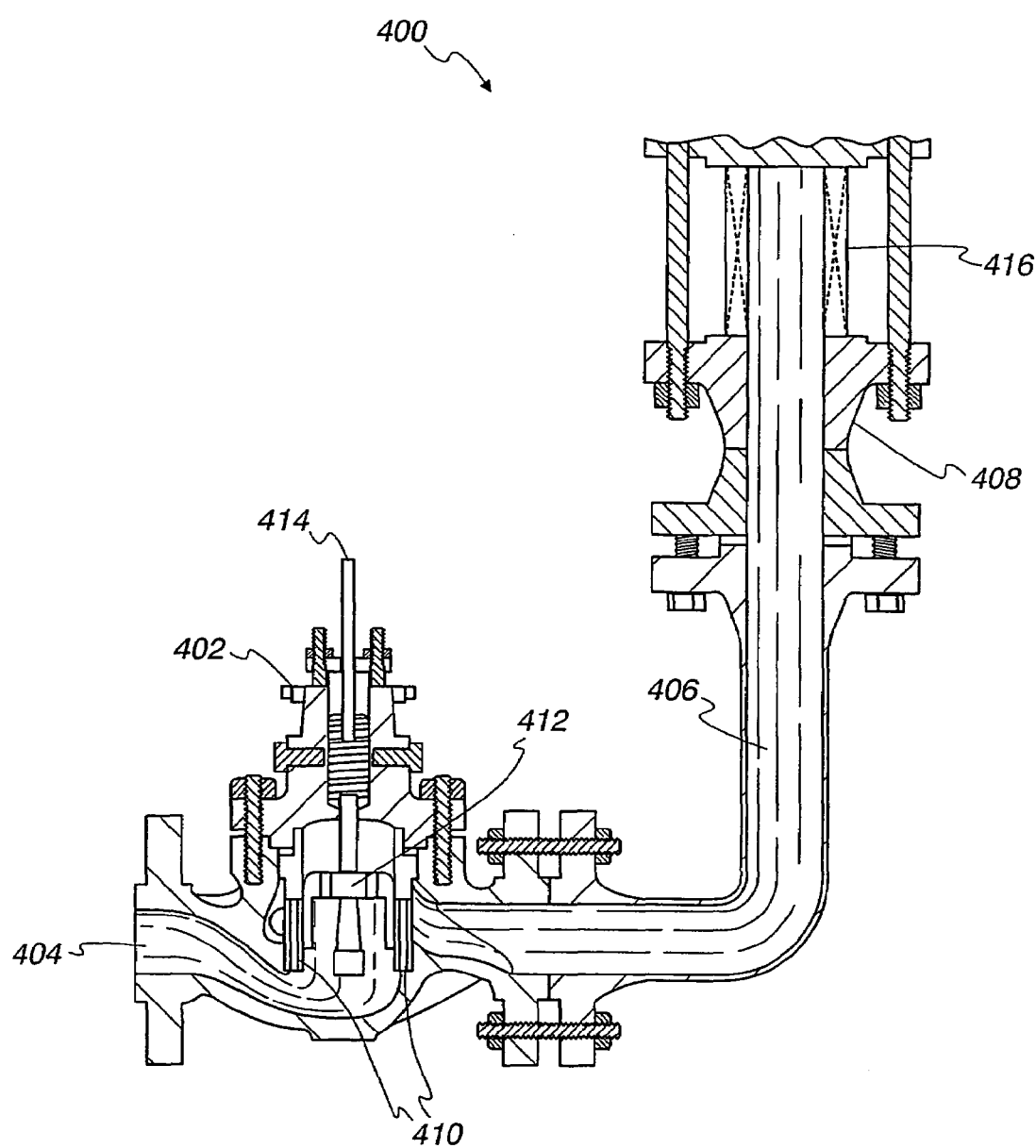
FIG. 4 is a cross-sectional view of an example process fluid handling system that may use the example fluid pressure reduction devices described herein.

FIG. 4 is a cross-sectional view of an example process fluid handling system 400 that may use the example PRDs 100 and 300 described herein. The example system 400 illustrates the use of PRDs in combination with pipes and valves and may be used in process fluid handling systems to transport the process fluid from one location to another.

The example system 400 includes a control valve 402, an inlet pipe 404, an outlet pipe 406, and an outlet structure 408. The control valve 402 includes a PRD 410 that functions as a valve cage, a plug 412 with an OD surface (not shown) that abuts to an ID surface (not shown) of the valve cage 410, and a stem 414. The outlet structure 408 includes a PRD 416 and that functions as a diffuser. The valve cage 410 and the diffuser 416 may be substantially similar or identical to the example PRDs described herein.

The control valve 402 is configured to control the amount of process fluid that flows from the inlet pipe 404 to the outlet pipe 406. The valve cage 410 includes a plurality of apertures substantially similar or identical to the plurality of apertures 116, 212, and 118 described in connection with FIGS. 2A and 2B above. The plug 412 is configured to cover the plurality of apertures of the valve cage 410 to control the amount of gas or liquid that flows from the inlet pipe 404 to the outlet pipe 406. The stem 414 may be used to move the plug 412 in, for example, a vertical direction to cover or uncover at least some of the apertures of the valve cage 410. Pressure build-up and turbulence in the inlet pipe may be reduced by the valve cage 410 when the process fluid flows from the inlet pipe 404 to the outlet pipe 406.

The process fluid then flows through the outlet pipe 406 and toward the outlet structure 408. The diffuser 416 is configured to relieve pressure in the process fluid exiting the outlet pipe 406. More specifically, the diffuser 416 may be used as a pressure relief stage for the process fluid by allowing at least a portion of the process fluid to escape through the plurality of apertures (not shown) of the diffuser 416.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A fluid pressure reduction device comprising:
a first cylinder having a first inner surface, a first outer surface, and a first plurality of apertures extending from the first inner surface to the first outer surface; and
a second cylinder disposed within the first cylinder and having a second inner surface, a second outer surface, and a second plurality of apertures extending from the second inner surface to the second outer surface, wherein a substantial portion of the first inner surface is in contact with a substantial portion of the second outer surface, and wherein at least portions of the first plurality of apertures overlap at least portions of the second plurality of apertures, wherein the first plurality of apertures of the first cylinder and the second plurality of apertures of the second cylinder are configured such that a radial fluid flow at the first inner surface is split into at least two axial fluid flows that are channeled into adjacent radial flow paths which, upon approaching the second inner surface, are channeled into axial flows and mixed with axial flow from an adjacent radial fluid flow.

2. A fluid pressure reduction device as defined in claim 1, wherein the flow paths are torturous flow paths.

3. A fluid pressure reduction device as defined in claim 1, wherein the first and second cylinders have different material compositions.

4. A fluid pressure reduction device as defined in claim 1, wherein at least one of the first cylinder and the second cylinder is associated with a pressure-reduction stage.

5. A fluid pressure reduction device as defined in claim 1, wherein the first cylinder and the second cylinder are frictionally engaged with each other.

6. A fluid pressure reduction device as defined in claim 1, wherein the first cylinder is in a fixed position relative to the second cylinder.

7. A fluid pressure reduction device as defined in claim 1, wherein the first and second cylinders are configured for use in at least one of a gas handling system or a liquid handling system.

8. A fluid pressure reduction device as defined in claim 1, wherein at least some of the first plurality of apertures function as at least one of plenums, inlet stages, or outlet stages.

9. A fluid pressure reduction device as defined in claim 8, wherein the plenums are associated with at least one of an axial flow and a radial flow.

10. A fluid pressure reduction device as defined in claim 1, wherein at least some of the second plurality of apertures function as at least one of plenums, inlet stages, or outlet stages.

11. A fluid pressure reduction device as defined in claim 10, wherein the plenums are associated with at least one of an axial flow and a radial flow.

12. A fluid pressure reduction device as defined in claim 1, wherein at least one of the first plurality of apertures forms a first portion of a plenum and wherein at least one of the second plurality of apertures forms a second portion of the plenum.

13. A fluid pressure reduction device as defined in claim 12, wherein the first portion of the plenum and the second portion of the plenum are formed using an acid etching manufacturing process.

14. A fluid pressure reduction device as defined in claim 1, wherein the first cylinder and the second cylinder are manufactured using at least one of an investment casting process, a laser cutting process, a water jet cutting process, an electrical discharge machining process, a powder metallurgy process, a metal injection molding process, an acid etching process, or a drawn tubing process.

15. A fluid pressure reduction device comprising:
a plurality of cylinders, each of the cylinders having an inner surface and an outer surface and a plurality of apertures extending from the inner surface to the outer surface, wherein the cylinders are arranged in a nested configuration so that a substantial portion of the inner surface of one of the plurality of cylinders is engaged with a substantial portion of the outer surface of another one of the plurality of cylinders, wherein at least portions of the apertures of the one of the plurality of cylinders overlap at least portions of the apertures of the other one of the plurality of cylinders to form at least one flow path, wherein the plurality of apertures of the cylinders are configured such that a radial fluid flow at the inner surface is split into at least two axial fluid flows that are channeled into adjacent radial flow paths which, upon approaching an outer surface of the fluid pressure reduction device, are channeled into axial flows and mixed with axial flow from an adjacent radial fluid flow.

16. A fluid pressure reduction device as defined in claim 15, wherein at least some of the plurality of apertures are at least one of a slot shape or a non-circular shape.

17. A fluid pressure reduction device as defined in claim 15, wherein at least some of the plurality of apertures function as at least one of plenums, inlet stages, or outlet stages.

18. A fluid pressure reduction device as defined in claim 15, wherein the at least one flow path is a torturous flow path.

19. A fluid pressure reduction device as defined in claim 15, wherein at least one of the plurality of cylinders is associated with a pressure-reduction stage.

20. A fluid pressure reduction device as defined in claim 15, wherein at least two of the plurality of cylinders are press fit together.

21. A fluid pressure reduction device as defined in claim 15, wherein at least two of the plurality of cylinders are assembled in a fixed position relative to one another.

22. A fluid pressure reduction device as defined in claim 15, wherein at least a first one of the plurality of cylinders includes a different material composition from at least a second one of the plurality of cylinders.

23. A fluid pressure reduction device as defined in claim 15, wherein at least one of the apertures of the one of the plurality of cylinders forms a first portion of a plenum and wherein at least one of the apertures of the other one of the plurality of cylinders forms a second portion of the plenum.

24. A fluid pressure reduction device as defined in claim 23, wherein the first portion of the plenum and the second portion of the plenum are formed using an acid etching manufacturing process.

25. A fluid pressure reduction device as defined in claim 15, wherein the plurality of cylinders are manufactured using at least one of an investment casting process, a laser cutting process, a water jet cutting process, an electrical discharge machining process, a powder metallurgy process, a metal injection molding process, an acid etching process, or a drawn tubing process.

26. A fluid pressure reduction device comprising:
a plurality of cylinders configured to form a relatively larger cylinder, each of the cylinders having an inner surface and an outer surface, and a plurality of apertures extending from the inner surface to the outer surface, wherein at least some of the outer surfaces are in contact with a substantial portion of at least some of the inner surfaces, and wherein at least some of the plurality of apertures are configured to overlap to form a flow path from the inner surface of one of the plurality of cylinders to the outer surface of another one of the plurality of cylinders such that the plurality of apertures of the cylinders provide an axial flow and a radial flow within the flow path formed between adjacent apertures such that a radial fluid flow at the inner surface is split into at least two axial fluid flows that are channeled into adjacent radial flow paths which, upon approaching an outer surface of the fluid pressure reduction device, are channeled into axial flows and mixed with an axial flow from an adjacent radial fluid flow.

27. A fluid pressure reduction device as defined in claim 26, wherein at least some of the plurality of apertures have at least one of a slot shape or a non-circular shape.

28. A fluid pressure reduction device as defined in claim 26, wherein at least some of the plurality of apertures function as at least one of plenums, inlet stages, or outlet stages.

29. A fluid pressure reduction device as defined in claim 26, wherein at least one of the plurality of cylinders is associated with a pressure-reduction stage.

30. A fluid pressure reduction device as defined in claim 26, wherein at least some of the plurality of cylinders are press fit together.

31. A fluid pressure reduction device as defined in claim 26, wherein at least some of the plurality of cylinders are assembled in a fixed position relative to one another.

32. A fluid pressure reduction device as defined in claim 26, wherein at least a first one of the plurality of cylinders includes a different material composition from at least a second one of the plurality of cylinders.

33. A fluid pressure reduction device as defined in claim 26, wherein at least a first one of the plurality of apertures forms a first portion of a plenum and wherein at least a second one of the plurality of apertures forms a second portion of the plenum.

34. A fluid pressure reduction device as defined in claim 33, wherein the first portion of the plenum and the second portion of the plenum are formed using an acid etching manufacturing process.

35. A fluid pressure reduction device as defined in claim 26, wherein the plurality of cylinders are manufactured using at least one of an investment casting process, a laser cutting process, a water jet cutting process, an electrical discharge machining process, a powder metallurgy process, a metal injection molding process, an acid etching process, or a drawn tubing process.

* * * * *